United States Patent [19]
Badesha et al.

[11] Patent Number: 5,840,796
[45] Date of Patent: Nov. 24, 1998

[54] POLYMER NANOCOMPOSITES

[75] Inventors: Santokh S. Badesha; Arnold W. Henry, both of Pittsford; James B. Maliborski, Rochester; Clifford O. Eddy, Webster, all of N.Y.

[73] Assignee: Xerox Corporation, Stamford, Conn.

[21] Appl. No.: 855,726

[22] Filed: May 9, 1997

[51] Int. Cl.$^6$ ............................................. C08K 3/34
[52] U.S. Cl. ............................................. 524/449; 524/447
[58] Field of Search ................................. 524/449, 447

[56] References Cited

U.S. PATENT DOCUMENTS

| | | | |
|---|---|---|---|
| 4,244,911 | 1/1981 | Ishizaka et al. | 264/331 |
| 4,684,238 | 8/1987 | Till et al. | 355/10 |
| 4,763,158 | 8/1988 | Schlueter, Jr. | 355/3 FU |
| 4,777,087 | 10/1988 | Heeks et al. | 428/321.1 |
| 5,032,547 | 7/1991 | Giannelis | 501/3 |
| 5,310,775 | 5/1994 | Sibilia | 524/447 |
| 5,337,129 | 8/1994 | Badesha | 355/275 |
| 5,361,126 | 11/1994 | Loonen et al. | 355/279 |
| 5,414,042 | 5/1995 | Yasue | 524/449 |
| 5,514,734 | 5/1996 | Maxfield | 524/445 |
| 5,552,469 | 9/1996 | Beall et al. | 524/445 |
| 5,578,672 | 11/1996 | Beall | 524/446 |

FOREIGN PATENT DOCUMENTS

| | | |
|---|---|---|
| 57-4055A | 1/1982 | Japan . |
| 62-68788A | 3/1987 | Japan . |

OTHER PUBLICATIONS

Derwent accession No. 95–182640/24 for Japanese Patent No. 7–101086, Matsushita Denki Sangyo KK., Apr. 1995 (abstract only).

Shelly D. Burnside and Emmanuel P. Giannelis, "Synthesis and Properties of New Poly(Dimethylsiloxane) Nanocomposites," Chemistry of Materials, vol. 7, No. 9, pp. 1597–1600 (Sep. 1995).

A set of fifteen slides (including the cover page) titled "Synthesis, Characterization, and Properties of Siloxane Nanocomposites," presented by Shelly D. Burnside and Emmanuel P. Giannelis at the American Chemical Society Northeastern Regional Meeting in Rochester, New York on Oct. 23, 1995.

A set of eighteen slides (including the cover page) titled "Polymer Matrix Nanocomposites," presented by Emmanuel P. Giannelis at the American Chemical Society Northeastern Regional Meeting in Rochester, New York on Oct. 25, 1995.

*Primary Examiner*—Paul R. Michl
*Attorney, Agent, or Firm*—Zosan S. Soong

[57] ABSTRACT

There is disclosed a polymer nanocomposite including a mica-type layered silicate and a fluoroelastomer, wherein the nanocomposite has a structure selected from the group consisting of an exfoliated structure and an intercalated structure.

16 Claims, 2 Drawing Sheets

POLYMER NANOCOMPOSITES

FIELD OF THE INVENTION

This invention relates to new polymer nanocomposites and methods for their preparation.

BACKGROUND OF THE INVENTION

In the field of polymer nanocomposites, researchers are attempting to enhance the polymer properties and extend their utility. For example, research efforts by Shelly D. Burnside and Emmanuel P. Giannelis, described below, involved polymer nanocomposites of a layered mica-type silicate (referred herein as "MTS") and poly (dimethylsiloxane). While suitable for some applications, nanocomposites containing MTS-siloxane cannot meet the requirements of every industrial application. Thus, there is a need for new polymer nanocomposites which are suitable for those industrial uses that cannot be met by conventional nanocomposites.

The following documents relate to nanocomposites, the disclosures of all of these documents being totally incorporated herein by reference:

Shelly D. Burnside and Emmanuel P. Giannelis, "Synthesis and Properties of New Poly(Dimethylsiloxane) Nanocomposites," CHEMISTRY OF MATERIALS, vol. 7, no. 9, pp. 1597–1600 (September 1995);

A set of fifteen slides (including the cover page) titled "Synthesis, Characterization, and Properties of Siloxane Nanocomposites," presented by Shelly D. Burnside and Emmanuel P. Giannelis at the American Chemical Society Northeastern Regional Meeting in Rochester, New York on Oct. 23, 1995; and A set of eighteen slides (including the cover page) titled "Polymer Matrix Nanocomposites," presented by Emmanuel P. Giannelis at the American Chemical Society Northeastern Regional Meeting in Rochester, New York on Oct. 25, 1995.

Santokh S. Badesha et al., U.S. application Ser. No. 08/556,556 (attorney docket no. D/95145) titled "Thermally Stable Fuser Member."

Santokh S. Badesha et al., U.S. application Ser. No. 08/556,554 (attorney docket no. D/95146) titled "Intermediate Toner Transfer Member."

SUMMARY OF THE INVENTION

The present invention is accomplished in embodiments by providing a polymer nanocomposite comprising a mica-type layered silicate and a fluoroelastomer, wherein the nanocomposite has a structure selected from the group consisting of an exfoliated structure and an intercalated structure.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
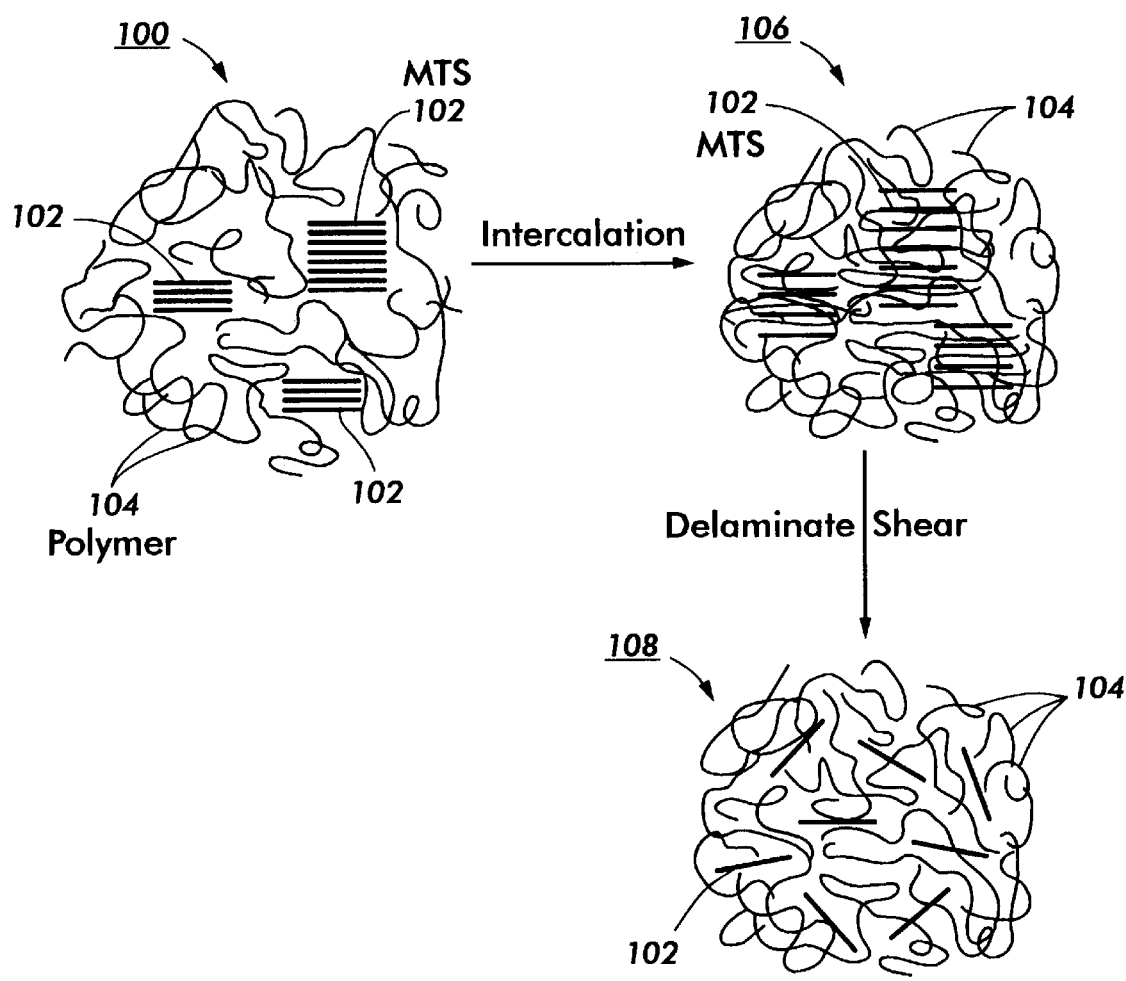
FIG. 1 is a schematic illustration of the intercalated and exfoliated nanocomposites together with the process steps to produce these structures.

To facilitate a greater understanding of the present invention, the following terms shall be interpreted to have the following meanings. Thermal stability shall refer to the ability of an elastomer to maintain its physical properties over time at one or more elevated temperatures and is expressed as a ratio of a property value determined at room temperature after exposure for a particular time at an elevated temperature over the property value at time To and room temperature. As used herein, the phrase room temperature refers to a temperature at about 25° C. In particular embodiments of the present invention, it refers to stability of physical properties at elevated transfuse temperatures (i.e., transfer and fusing of the toner image to a sheet at substantially the same time at a temperature of from about 70° to about 150° C.) and beyond in an electrostatographic printing apparatus. The lesser the reduction in the property over time at $T_1$, $T_2$, or $T_3$ the greater the thermal stability.

The term nanocomposite refers to nanoscale fillers like MTS in the elastomeric polymer and especially the MTS in an intercalated or exfoliated state in the polymer.

The term mica-type layered silicate (referred to herein as "MTS") shall mean a leaf or sheet like laminated phyllosilicate mineral, typically natural or synthetic complex hydrous silicates based on aluminum, magnesium, sodium, potassium, calcium, lithium and iron silicates, usually having flat, six-sided monoclinic crystals, low hardness and perfect or near perfect basal cleavage. Typically they have a high degree of flexibility, elasticity and toughness and have laminae of the order of 10 angstroms in thickness which under mild shear in rubber processing equipment can be delaminated or exfoliated. They are typically clays. Typical examples include the principle mica-types of the general formula

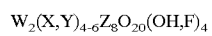

where W is usually potassium; X, Y are aluminum, magnesium, iron or lithium and Z is silicon alone or both silicon and aluminum (i.e., in certain clay compositions some of the Z atoms can be silicon and the remaining Z atoms can be aluminum) include muscovite, phlogopite, biotite, and lepidolite. The formula given above is by necessity only approximate since MTS are minerals having various impurities. Other materials falling within the general designation of MTS include montmorillonite, bentonite, hectorite, vermiculite and saponite. Commercially available materials include montmorillonite, bentonite and hectorite which are available from Southern Clay Products, Gonzales, Tex. A list of suitable mica-type silicates can be found in the CRC Handbook of Chemistry and Physics 58th Edition, 1977–8, pp. B-250 to B-252 or in the 77th Edition, pp. 4-137 to 4-147, the disclosures of which are totally incorporated herein by reference. Two types of nanocomposites representing the end members of a structural hierarchy are possible: (a) intercalated, in which extended polymer chains are intercalated between the host layers resulting in a well ordered multilayer, where the layers of the silicate retain their structural registry; and (b) delaminated (also referred herein as exfoliated), in which the host layers (having a thickness on a nanometer scale) are dispersed in a continuous polymer matrix. In contrast to the intercalated hybrids, the interlayer expansion in delaminated nanocomposites is comparable to the radius of gyration of the polymer, and the host layers have lost their structural registry. The term aspect ratio shall refer to the ratio of the length to thickness of the mica-type layer silicates and the term high aspect ratio shall define a large dimensional ratio of the MTS.

The mica-type layered silicate may be present in an amount ranging for example from about 1% to about 50% by weight, preferably from about 5% to about 20% by weight, more preferably up to about 10% by weight, and especially from about 5% to about 10% by weight, based on the weight of the nanocomposite (also referred herein as "elastomer composition"). The mica-type layered silicates have laminae on the order of 10 angstroms in thickness. They also have a large length to thickness ratio because of the plate like structure which is referred to hereinafter as having a high aspect ratio. Typically the mica-type layered silicates have a maximum length on the order of 1 micrometer and an aspect ratio of length to thickness of from about 50 to about 1000. As a result the mica-type layered silicates when used as a filler to enhance the thermal conductivity or modulus of the fluoroelastomer form a continuous touching path to conduct heat. The mica-type layered silicates are typically used in amounts up to about 10% by weight of the total weight of the elastomer composition to provide the desired thermal stability and swell resistance. In certain embodiments of the present invention, beyond about 10% by weight of the elastomer composition, additional amounts of the mica-type layered silicate may merely provide a filler effect without further enhancing the desired properties. While not wishing to be bound to any theory, it is believed that the sheets of the mica-type layered silicate provide antioxidant properties due to their large surface area and high aspect ratio acting as an oxygen barrier which thermally stabilizes the area that surrounds it Suitable fluoroelastomer examples include those described in detail in Lentz, U.S. Pat. No. 4,257,699, as well as those described in Eddy et al., U.S. Pat. No. 5,017,432 and Ferguson et al., U.S. Pat. No. 5,061,965, the disclosures of which are totally incorporated by reference. As described therein these fluoroelastomers, particularly from the class of copolymers and terpolymers of vinylidenefluoride, hexafluoropropylene, and tetrafluoroethylene, are known commercially under various designations as VITON A™, VITON E™, VITON E60C™, VITON E430™, VITON 910™, VITON GH™ and VITON GF™. The VITON™ designation is a Trademark of E.I. Dupont deNemours, Inc. Other commercially available materials include FLUOREL 2170™, FLUOREL 2174™, FLUOREL 2176™, FLUOREL 2177™, FLUOREL FC2145™ and FLUOREL LVS 76™, FLUOREL™ being a Trademark of 3M Company. FLUOREL FC2145™ is a copolymer of vinylidenefluoride and hexafluoropropylene. Additional commercially available materials include AFLAS™ a poly(propylene-tetrafluoroethylene), FLUOREL II™ (LII900) a poly (propylenetetrafluoroethylene-vinylidenefluoride) both also available from 3M Company as well as the TECNOFLON™ compositions identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent and in U.S. Pat. No. 5,017, 432. In a particularly preferred embodiment, the fluoroelastomer is one having a relatively low quantity of vinylidenefluoride, such as in VITON GF™, available from E.I. Dupont deNemours, Inc. The VITON GF™ has 35 weight percent vinylidenefluoride, 34 weight percent hexafluoropropylene and 29 weight percent tetrafluoroethylene with 2 weight percent cure site monomer. It is generally cured with bisphenol phosphonium salt, or a conventional aliphatic peroxide curing agent The crosslinking agent used in the composition is for the purpose of obtaining a material with sufficient crosslink density to obtain maximum strength and fatigue resistance. The amount of crosslinking agent employed is not critical as long as the amount used is sufficient to create an effectively crosslinked, elastomeric network yielding optimum mechanical properties.

Other additives or agents may be incorporated in the elastomer composition in accordance with the present invention as long as they do not detrimentally affect the integrity of the fluoroelastomer or the nanocomposite. Such agents include coloring agents, processing aids, conductive fillers (thermal and electrical), accelerators and polymerization initiators which may be used in addition to crossliking agents. MTS alone or in combination with low or high hardness fillers such as alumina may be dispersed in the fluoroelastomer (also referred herein as "elastomer") in any suitable or convenient form or manner. It is preferably uniformly dispersed in the elastomer during compounding. For example, when the elastomer is in the form of a gum, the MTS and other filler may be milled into the gum prior to curing to form the elastomer. In general the MTS and any filler are dispersed in the elastomer by mixing with the elastomer gum or other millable form of the elastomer compound preferably prior to solution or homogenization before application to the base member. The MTS and other filler present may be dispersed in the elastomer by conventional methods known to those skilled in the art. For example in a pebble mill, the MTS and elastomer may be compounded during which the MTS may be reduced in particle size. The compounding, however, should not be carried out to such a degree or level extent that the MTS loses its general leaf structure.

Attention is directed now to FIG. 1 wherein the manufacture of the nanocomposites is schematically illustrated. In this schematic, the first area 100 illustrates the laminated mica-type layered silicates 102 in a polymer (i.e., the fluoroelastomer) 104 which when subjected to an elevated temperature and mechanical shear such as, by for example, simple stirring or mixing in a ball or pebble mill intercalates the layers of the mica-type layered silicate such that polymer chains of the fluoroelastomer 104 are inserted between the layers of the mica-type silicates 102 as illustrated in the second area 106 of FIG. 1. After further mixing of the intercalated nanocomposite of the second area 106 at a higher elevated temperature, there is produced an exfoliated nanocomposite as illustrated in the third area 108 of FIG. 1 with the delaminated layers of the mica-type layered silicate 102 dispersed in the fluoroelastomer 104. The intercalated phenomena start with surface treating the MTS with long chain alkyl ammonium salts or amino acids such as dimethyl dioctadecyl ammonium salt or n-dodecylamino acid to give the MTS an organophilic nature. This will then enhance the wetting of the MTS by fluoroelastomer materials. On mixing the surface treated MTS with the fluoroelastomer, the polymer chains of the fluoroelastomer penetrate the MTS laminae causing each lamina to be surrounded by polymer chains of the fluoroelastomer as the MTS exfoliates. The exfoliated nanocomposite may be formed with or without going through the intermediate stage of intercalation.

Any suitable temperatures may be employed during mixing. The temperature used during mixing to produce the intercalated nanocomposite ranges for example from about 110° to about 150° F., preferably ranging from about 120° to about 130° F. The higher temperature used during mixing to produce the exfoliated nanocomposite may be above about 150° F., preferably ranging from about 150° to about 200° F., and more preferably ranging from about 155° to about 170° F.

The mixing may occur for any suitable time. To produce the intercalated nanocomposite, the mixing time ranges for example from about 5 minutes to about 10 hours, preferably from about 5 minutes to about 30 minutes. To produce the exfoliated nanocomposite, the mixing time ranges for example from about 10 minutes to about 15 hours, preferably from about 10 minutes to about 30 minutes.

The present nanocomposites may be a layer of a component used in electrostatographic printing machines. For example, the present nanocomposite may be a layer of a fusing subsystem component (e.g., a fuser member, a donor member, and a pressure member) or a layer of an intermediate toner image transfer member. These nanocomposites may be used as seals and O-rings. It is believed that fluoroelastomer nanocomposites are more thermally stable than silicone nanocomposites.

A component having the present nanocomposite may be prepared by applying the elastomer having the MTS and any filler dispersed therein directly to the base member or substrate in one application or by successively applying layers of the nanocomposite to the base member. The coating is most conveniently carried out by spraying or dipping in a light solution of homogeneous suspension containing the MTS. Molding, extruding and wrapping are also alternative techniques which may be used to make the desired component.

There may be an adhesive layer between the outer nanocomposite layer and the substrate. The adhesive layer may have a thickness ranging for example from about 0.1 mil to about 3 mils, and more preferably from about 1 mil to about 2 mils. Examples of adhesives include: THIXON 403/404™ and THIXON 330/301™ both available from Morton International of Ohio; GE-2872-074™ available from the General Electric Company which is believed to be a copolymer of polyimide and siloxane; a silane coupling agent such as Union Carbide A-1100™ which is an amino functional siloxane; epoxy resins including bisphenol A epoxy resins available for example from Dow Chemical Company such as Dow TACTIX 740™, Dow TACTIX 741™, and Dow TACTIX 742™, and the like, optionally with a crosslinker or curative such as Dow H41™ available from the Dow Chemical Company.

The substrate may have a thickness ranging for example from about 2 mils to about 4 mils. Examples of materials for the substrate include polyvinyl fluoride, such as TEDLAR®, available from E.I. DuPont de Nemours & Company, where the polyvinyl fluoride can be loaded with conductive or dielectric fillers such as carbon particles, titanium dioxide, barium titanate, or any other filler capable of decreasing dielectric thickness; and polyvinylidene fluoride, such as KYNAR®, available from Elf Atochem of Philadelphia, Penn., where the polyvinylidene fluoride can be loaded with conductive or dielectric fillers such as carbon particles, titanium dioxide, barium titanate, or any other filler capable of decreasing dielectric thickness. In addition, metals that can be coated include aluminum, copper, brass, nickel zinc, chromium, stainless steel semitransparent aluminum, steel, cadmium, silver, gold, indium, tin, and the like. Metal oxides, including tin oxide, indium tin oxide, and the like, are also suitable.

The component containing the nanocomposite can be of any suitable configuration including a sheet, a web, a foil, a strip, a coil, a cylinder, a drum, an endless belt, an endless mobius strip, a circular disc, or the like.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

EXAMPLE 1

Figure 2:
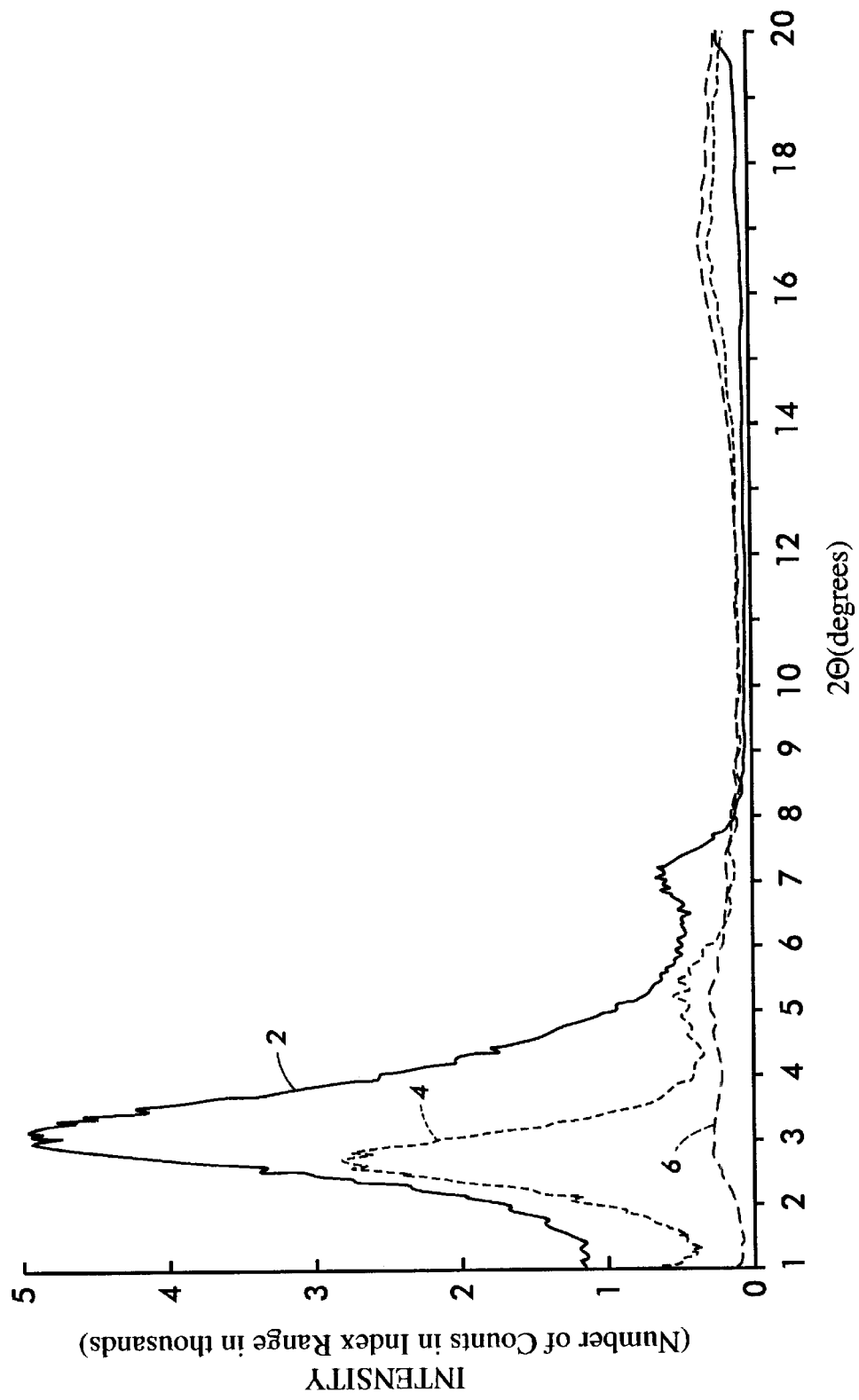
FIG. 2 consists of simplified X-ray spectra of the three sample compositions produced by the procedures described in the examples.

An organophyllic clay, SCPX-984™ (referred herein as the treated clay) available from Southern Clay Corp., contains a dimethyl dioctadecyl ammonium salt within the layered structure of the clay. Southern Clay Corp. prepared SCPX-984™ by mixing an MTS clay with an aqueous solution of excess quaternary ammonium salt whereupon the reaction occurred spontaneously. Ten parts by weight of the treated clay were added to 100 parts by weight of a fluoroelastomer, FLUOREL FC2145™, available from 3M Company, and the two compositions were milled together with a tight nip, at 80° F. for 15 minutes on a two roll rubber mill manufactured by Farrell. The two roll mill was water cooled to keep the temperature of the fluoroelastomer plus treated clay below 100° F. during the milling operation. An uncrosslinked sample containing only the fluoroelastomer plus treated clay was analyzed by X-ray diffraction. As seen in FIG. 2, curve 2 showed the X-ray spectrum of the clay SCPX-984™, indicating that no intercalation had taken place.

EXAMPLE 2

Ten parts by weight of the treated clay, SCPX-984™, were added to 100 parts by weight of FLUOREL FC2145™ and milled using a Farrell internally heated two roll rubber mill using the same procedures as in Example 1 with the exception that hot water was used to heat the mill rolls to 120° F. As seen in FIG. 2, curve 4, the resulting X-ray diffraction spectra exhibited a narrow, strong peak corresponding to a 33 Angstrom spacing, which indicated intercalation of the nanocomposite. Since the X-ray diffraction peak for the SCPX-984™ alone is at 28.8 Angstroms (see curve 2 of FIG. 2), the peak at 33 Angstroms indicated that the fluoroelastomer had penetrated the treated clay layers and spread them apart the additional 4.2 Angstroms. In this Example 2, the clay can be considered intercalated with the fluoroelastomer inserted between the layers of the clay.

EXAMPLE 3

The intercalated composition of Example 2 was subjected to two roll milling using the same procedures as in Example 1 except that hot water was used to increase the temperature of the mill rolls to a mill roll temperature of 150° F. The resulting sample was analyzed by X-ray diffraction. As seen in FIG. 2, curve 6, the sample from Example 3 exhibited no peaks in the X-ray spectra. No evidence of layer spacing or crystal ordering could be seen, providing evidence that exfoliation had taken place. In this exfoliated sample, the clay layers had been penetrated to such an extent that the individual layers of the clay were peeled apart and distributed randomly within the fluoroelastomer.

The above examples indicated that obtaining the intercalated and exfoliated states with respect to certain clays and fluoroelastomers depended on the temperature at which the two materials were mixed.

Other modifications of the present invention may occur to those skilled in the art based upon a reading of the present disclosure and these modifications are intended to be included within the scope of the present invention.

We claim:

1. A polymer nanocomposite comprising a mica layered silicate and a fluoroelastomer, wherein the nanocomposite has a structure selected from the group consisting of an exfoliated structure and an intercalated structure wherein the fluoroelastomer is a copolymer or terpolymer consisting of monomers selected from the group consisting of vinylidenefluoride, hexafluoropropylene, and tetrafluoroethylene.

2. The nanocomposite of claim 1, wherein the nanocomposite has the exfoliated structure where the delaminated layers of the mica layered silicate are dispersed in the fluoroelastomer.

3. The nanocomposite of claim 1, wherein the nanocomposite has the intercalated structure where the fluoroelastomer is inserted between the layers of the mica silicate.

4. The nanocomposite of claim 1, wherein the mica layered silicate has an aspect ratio of length to thickness ranging from about 50 to about 1000.

5. The nanocomposite of claim 1, wherein the mica layered silicate is present in an amount ranging from about 1% to about 50% by weight based on the weight of the nanocomposite.

6. The nanocomposite of claim 1, wherein the mica layered silicate is present in an amount ranging from about 5% to about 20% by weight based on the weight of the nanocomposite.

7. The nanocomposite of claim 1, wherein the mica layered silicate is montmorillonite, bentonite, or hectorite.

8. The nanocomposite of claim 1, wherein the nanocomposite is prepared by mixing at an elevated temperature the fluoroelastomer and the mica layered silicate.

9. The nanocomposite of claim 8, wherein the mixing is accompanied by shearing forces.

10. The nanocomposite of claim 8, wherein the mixing is accomplished by milling.

11. The nanocomposite of claim 8, wherein the elevated temperature and the mixing results in the intercalated structure.

12. The nanocomposite of claim 11, wherein the elevated temperature ranges from about 110° to about 150° F.

13. The nanocomposite of claim 11, wherein the elevated temperature ranges from about 120° to about 130° F.

14. The nanocomposite of claim 8, wherein the elevated temperature and the mixing results in the exfoliated structure.

15. The nanocomposite of claim 8, wherein the elevated temperature is above about 150° F.

16. The nanocomposite of claim 8, wherein the elevated temperature ranges from about 150° to about 200° F.

* * * * *